US010000417B2

(12) United States Patent
Gupta et al.

(10) Patent No.: US 10,000,417 B2
(45) Date of Patent: Jun. 19, 2018

(54) FUSED CAST REFRACTORY MATERIAL BASED ON ALUMINIUM OXIDE, ZIRCONIUM DIOXIDE AND SILICON DIOXIDE, AND USE OF SUCH A MATERIAL

(71) Applicant: REFRACTORY INTELLECTUAL PROPERTY GMBH & CO. KG, Vienna (AT)

(72) Inventors: Amul Gupta, Falconer, NY (US); Roland Heidrich, San Vito al Tagliamento (IT); Fabio Iurlaro, San Vito (IT); Barbara Corrado, San Vito (IT); Kevin Selkregg, Dewittville, NY (US); Ivan Pagnucco, Arzene (IT); Ilario Lenarduzzi, Cordovado (IT); Luciano Batagelj, San Vito al Tagliamento (IT)

(73) Assignee: REFEL S.p.A., Tagliamento (IT)

( * ) Notice: Subject to any disclaimer, the term of this patent is extended or adjusted under 35 U.S.C. 154(b) by 0 days. days.

(21) Appl. No.: 14/411,851

(22) PCT Filed: Jul. 15, 2013

(86) PCT No.: PCT/EP2013/064946
§ 371 (c)(1),
(2) Date: Dec. 29, 2014

(87) PCT Pub. No.: WO2014/029558
PCT Pub. Date: Feb. 27, 2014

(65) Prior Publication Data
US 2015/0158770 A1 Jun. 11, 2015

(30) Foreign Application Priority Data

Aug. 24, 2012 (EP) .................................... 12181714

(51) Int. Cl.
*C03B 35/10* (2006.01)
*C03B 5/43* (2006.01)
*C04B 35/109* (2006.01)

(52) U.S. Cl.
CPC .............. *C04B 35/109* (2013.01); *C03B 5/43* (2013.01); *C04B 2235/3201* (2013.01);
(Continued)

(58) Field of Classification Search
CPC . C04B 2235/80; C04B 35/109; C04B 41/009; C04B 35/00; C04B 35/14;
(Continued)

(56) References Cited

U.S. PATENT DOCUMENTS 7,384,438 B1   6/2008  Rosenflanz
7,642,211 B2 * 1/2010  Boussant-Roux ........ C03B 5/43
                                                       501/105

(Continued)

FOREIGN PATENT DOCUMENTS

CN   101027262 A   8/2007
FR     2875497 A1  3/2006
(Continued)

OTHER PUBLICATIONS

International Search Report for App. No. PCT/EP2013/064946 filed Jul. 15, 2013.

*Primary Examiner* — Jodi C Franklin
(74) *Attorney, Agent, or Firm* — Walker & Jocke

(57) ABSTRACT

The invention relates to a fused cast refractory material based on aluminium oxide, zirconium dioxide and silicon dioxide, and a use of such a material.

6 Claims, 2 Drawing Sheets

(52) U.S. Cl.
CPC .. *C04B 2235/3418* (2013.01); *C04B 2235/72* (2013.01); *C04B 2235/727* (2013.01); *C04B 2235/77* (2013.01)

(58) Field of Classification Search
CPC ......... C04B 35/10; C04B 35/48; C04B 35/18; C04B 2235/3217; C04B 2235/3244; C04B 28/06; C04B 41/5031; C04B 35/6263; C04B 14/4625; C04B 14/306; C04B 41/5022; C04B 35/1015; C04B 35/106

See application file for complete search history.

(56) References Cited

U.S. PATENT DOCUMENTS

| | | | |
|---|---|---|---|
| 2001/0019992 A1* | 9/2001 | Gaubil | C04B 35/109 501/105 |
| 2007/0270303 A1 | 11/2007 | Boussant-Roux et al. | |
| 2012/0216566 A1* | 8/2012 | Ishino | C03B 5/43 65/29.12 |

FOREIGN PATENT DOCUMENTS

| | | | | |
|---|---|---|---|---|
| GB | 2147287 | * | 5/1985 | ............. C04B 35/10 |
| JP | H01-036421 | | 2/1989 | |
| JP | H10101439 A | | 4/1998 | |
| JP | 2008513328 A | | 5/2008 | |
| WO | 0208143 A2 | | 1/2002 | |

\* cited by examiner

FUSED CAST REFRACTORY MATERIAL BASED ON ALUMINIUM OXIDE, ZIRCONIUM DIOXIDE AND SILICON DIOXIDE, AND USE OF SUCH A MATERIAL

The invention relates to a fused cast refractory material based on aluminium oxide, zirconium dioxide and silicon dioxide, and a use of such a material.

Fused cast refractory materials including aluminium oxide ($Al_2O_3$), zirconium dioxide ($ZrO_2$) and silicon dioxide ($SiO_2$) as the main components are called fused cast AZS products or AZS bricks.

AZS bricks are used in melter tanks and gathering ends in the glassmaking industry in areas that come into contact with the molten glass, but also in the superstructure and crown of the tanks.

Fused cast AZS bricks have a vitreous phase that comprises $SiO_2$, $Al_2O_3$, $ZrO_2$ and $Na_2O$ (sodium oxide) as main components. When the AZS brick is used, the vitreous phases form melting phases with low melting point that may be sweated out of the brick and come into contact with the molten glass due to their low viscosity. This sweating out of the molten phase fractions of the vitreous phase, also called to as exudation, may contaminate the molten glass.

In the past therefore, there has been no shortage of attempts to make AZS bricks having a lower rate of exudation when used in a glass tank. Such attempts to produce AZS bricks in which the tendency to exudate was lower concentrated particularly on reducing the fraction of vitreous phases in the fused cast AZS bricks. In another approach, efforts were concentrated on reducing the formation of molten phase fractions of the vitreous phase by establishing a given ratio between the fractions of $SiO_2$ and $Na_2O$ in the vitreous phase.

However, the fused cast AZS bricks yielded by these methods still exhibited a tendency to exudate abundantly when used in the glass tanks, a property that is capable of significantly impairing the molten glass.

DETAILED DESCRIPTION

Figure 1:
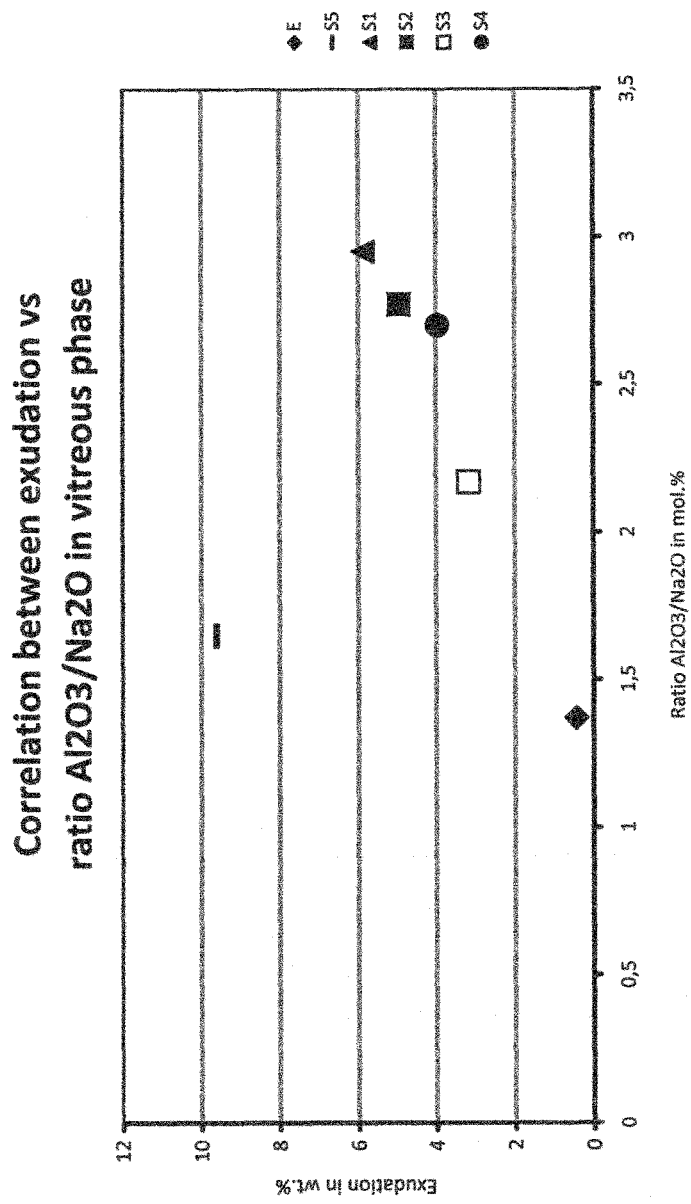
FIG. 1 describes the correlation between exudation vs. ratio $Al_2O_3/Na_2O$ in the vitreous phase.

The object of the invention is to provide a fused cast refractory material based on aluminium oxide, zirconium dioxide and silicon dioxide, particularly in the form of an AZS brick, that exhibits reduced tendency to exudate when used in glass tanks.

In order to solve this object, according to the invention a fused cast refractory material based on aluminium oxide, zirconium dioxide and silicon dioxide is provided, having a vitreous phase fraction comprising $Al_2O_3$ and $Na_2O$, wherein the molar ratio between $Al_2O_3$ and $Na_2O$ in the vitreous phase is in the range from 0.8 to 1.6, relative to the vitreous phase.

The fused cast refractory material according to the invention is a fused cast shaped refractory material, in the form of a fused cast and shaped AZS product, particularly in the form of a fused cast AZS brick.

The exceptionally low tendency to exudate exhibited by the material according to the invention does not take place unless the material components are present in the material in the very narrowly defined fractions according to the invention.

The invention is based particularly on the realisation that the tendency to exudate of a fused cast AZS brick is determined by the fractions of $Al_2O_3$ and $Na_2O$, and particularly by the proportion of the fractions of these components relative to one another in the vitreous phase fraction of the AZS brick. According to the invention, it was found that it is possible to provide a fused cast AZS brick with exceptionally low tendency to exudate if the fractions of $Al_2O_3$ and $Na_2O$ in the fused cast brick are in the fraction range as set forth herein.

Surprisingly, it has been revealed according to the invention that the material according to the invention has a particularly low tendency to exudate when the molar ratio between $Al_2O_3$ and $Na_2O$ in the vitreous phase of the material is within a characteristic range from 0.8 to 1.6, relative to the vitreous phase. The molar ratio between $Al_2O_3$ and $Na_2O$ in the vitreous phase of the material according to the invention may particularly preferably be at least 0.8 or 0.83 or 0.87 or 0.9 or 0.93 or 0.96 or 1.0 or 1.03 or 1.06 or 1.1 and not above 1.6 or 1.58 or 1.53 or 1.5 or 1.46 or 1.43 or 1.4.

It has been discovered that the tendency to exudate of a species-related AZS brick can increase sharply if the molar ratio between $Al_2O_3$ and $Na_2O$ in the vitreous phase is even slightly outside of the ranges cited previously. For example, the tendency of an AZS brick to exudate may be greater by a factor of 10 or 20 if the molar ratio between $Al_2O_3$ and $Na_2O$ in the vitreous phase of an AZS brick is 1.65, that is to say only slightly above the value of 1.6.

A further surprising discovery is that the tendency to exudate of a material according to the invention may be particularly low when the fraction of $Na_2O$ in the vitreous phase is relatively high. According to one embodiment, it may therefore be provided that the molar fraction of $Na_2O$ in the vitreous phase is in the range from 8.0 to 14.0 mole percent relative to the vitreous phase, and for example at least 9.0 or 9.5 or 10 mole percent relative to the vitreous phase. An upper limit of the $Na_2O$ fraction in the vitreous phase may be 14.0 or 13.0 or 12.0 or 11.5 or 11.0 mole percent, for example, again relative to the vitreous phase.

The vitreous phase may contain all of the components of the material according to the invention, in particular the components $Al_2O_3$, $Na_2O$ and $SiO_2$.

According to one embodiment of the invention, the molar fraction of $Al_2O_3$ in the vitreous phase may be in the range of the molar fraction of $Na_2O$ or slightly higher, that is for example in a range from 8.0 to 18.0 mole percent relative to the vitreous phase, and for example may be at least 8.0 or 9.0 or 10.0 or 10.5 or 11.0 or 11.5 or 12.0 or 12.5 mole percent relative to the vitreous phase. An upper limit of the $Al_2O_3$ fraction in the vitreous phase may be 18.0 or 17.0 or 16.0 or 15.0 or 14.5 or 14.0 or 13.5 mole percent, for example, again relative to the vitreous phase.

The molar fraction of $SiO_2$ in the vitreous phase may be in the range from 70.0 to 84.0 mole percent relative to the vitreous phase, and for example may be at least 70.0 or 72.0 or 74.0 mole percent relative to the vitreous phase. An upper limit of the $SiO_2$ fraction in the vitreous phase may be 84.0 or 82.0 or 80.0 or 78.4 mole percent, for example, again relative to the vitreous phase.

The material according to the invention may contain a relatively large fraction of vitreous phase compared with the AZS bricks known from the prior art, for example a vitreous phase fraction greater than 20.0% by mass, for example yet greater than 22.0 or 23.0 or 23.3 or even 24.0% by mass as well. Moreover, it may particularly be provided that the fraction of vitreous phase in the material according to the invention is not greater than 30.0% by mass, that is to say for example also not above 28.0 or 27.0 or 26.3 or 26.0% by mass. The fraction of vitreous phase in the material according to the invention may preferably be in the range from 22.0 to 27.0% by mass, particularly preferably 23.3 to 26.3% by mass.

As set forth in the precedings, the invention is based particularly on the realisation that the tendency to exudate of a fused cast AZS brick is determined by the fractions of $Al_2O_3$ and $Na_2O$, and particularly by the proportion of the fractions of these components relative to one another in the vitreous phase fraction of the AZS brick. Beside the proportion of the fractions of these components relative to one another in the vitreous phase fraction, according to the invention, it was found that it is possible to provide a fused cast AZS brick with exceptionally low tendency to exudate if the fractions of $Al_2O_3$ and $Na_2O$ in the fused cast brick, i.e. in the bulk material, are in the mass fraction range set forth herein.

All of the values in mass percentage, provided herein, are mass percentage values relative to the overall mass of the material according to the invention unless otherwise indicated in individual cases.

According to a preferred embodiment of the invention, the mass fraction of $Al_2O_3$ in the material may be present in the range from 60 to 70% by mass, particularly preferably in a fraction of at least 61.0 or 61.75 or 62.9% by mass and in a fraction of not above 69.0 or 68.4 or 66.2 or 65.5% by mass.

The fraction of $Na_2O$ in the material may be present in the range from 2.0 to 2.6% by mass, particularly preferably in a fraction of at least 2.1 or 2.2% by mass and in a fraction of not above 2.5 or 2.45% by mass.

In this context, it was also particularly surprising to discover that the fractions of $Na_2O$ in the refractory material according to the invention are relatively high, and that it was therefore to be expected that a fused cast AZS brick comprising such a high fraction of $Na_2O$ would exhibit a marked tendency to exudate. Because a high fraction of $Na_2O$ in a fused cast AZS brick is usually associated with a high fraction of vitreous phase with low viscosity and thus also with a high fraction of molten phases that would cause increased exudation when the brick was used.

In fact, the fraction of vitreous phases in the material according to the invention may indeed by relatively large. However, it has been discovered according to the invention that the high fraction of vitreous phases in the material according to the invention does not result in the formation of a large fraction of molten phases with low melting point when the material is used, because these vitreous phases form highly viscous molten phases due to the characterizing fraction of $Al_2O_3$ and $Na_2O$ in the material according to the invention, such that the material according to the invention has an extremely low tendency to exudate when it is used in tank furnaces.

The molar ratio of $Al_2O_3$ to $Na_2O$ in the material according to the invention is preferably in the range from 14.0 to 21.3, particularly preferably in a molar ratio of at least 15.0 or 15.6 and not above 19.2 or 17.8.

Beside $Al_2O_3$ and $Na_2O$, the fused cast material according to the invention may comprise further components in the range from 38.0 to 27.4% by mass. Such further components are $ZrO_2$ and $SiO_2$ beside any further components, if any.

The mass fraction of the component $ZrO_2$ in the fused cast material according to the invention may be of particular importance for corrosion resistance and mechanical stability in the production process.

The mass fraction of the $ZrO_2$ component in the material according to the invention may be for example in the range from 13 to 19% by mass, particularly preferably in a mass fraction of at least 14.0 or 15.0 or 15.9 or 16.2% by mass and in a mass fraction of not above 18.5 or 18.0 or 17.5% by mass. The mass fraction of $ZrO_2$ indicates the sum of the mass fraction of $ZrO_2$ and $HfO_2$ in the fused cast refractory material of the present invention as $ZrO_2$ and $HfO_2$ are hardly to differentiate analytically. According to the invention, the mass fraction of the $HfO_2$ component in the material according to the invention may be for example below 0.5% by mass, particularly preferably below 0.4% by mass.

The mass fractions of the component $SiO_2$ in the fused cast material according to the invention may also be of particular importance for the vitreous phase formation and for the exudation behaviour.

The mass fraction of the $SiO_2$ component in the material according to the invention may be in the range from 15 to 18% by mass, particularly preferably in a mass fraction of at least 15.5 or 15.9% by mass and in a mass fraction of not above 17.5 or 17.2 or 17.0% by mass.

According to one embodiment, it may particularly be provided that the mass fraction of further components that are present in the material according to the invention beside $Al_2O_3$, $Na_2O$, $ZrO_2$ and $SiO_2$ is relatively low and for example is below 1.0 or 0.5 or 0.25% by mass or even below 0.2% by mass. Such further components can be, for example, one or several of the following components: $Fe_2O_3$, $TiO_2$, CaO, $K_2O$, MgO, $Li_2O$, $Cr_2O_3$, BaO, $B_2O_3$, $P_2O_5$ or CuO. Preferably, the mass fraction of each of theses further components is present in the material according to the invention below 0.1% by mass. Moreover, preferably the mass fraction of theses further components is present in the material according to the invention below the following % by mass:

$Fe_2O_3$ below 0.1 or 0.08% by mass;
$TiO_2$ below 0.06 or 0.05% by mass
CaO below 0.05 or 0.04% by mass;
$K_2O$ below 0.04 or 0.03 by mass;
MgO below 0.03 or 0.2% by mass;
$LiO_2$ below 0.1 or 0.01% by mass;
$Cr_2O_3$ below 0.1 or 0.01% by mass,
$B_2O_5$ below 0.1 or 0.01% by mass;
$P_2O_5$ below 0.1 or 0.01% by mass;
CuO below 0.1 or 0.01% by mass.

The bulk density of the material according to the invention may be relatively low. According to one embodiment, the bulk density of the material according to the invention is below 3.7 $g/cm^3$, for example below 3.6 or 3.56 $g/cm^3$ as well. The bulk density of the material according to the invention may be for example at least 3.3 $g/cm^3$, that is to say for example at least 3.4 or 3.45 or 3.5 or 3.53 $g/cm^3$. The bulk density of the material according to the invention is preferably in a range from 3.4 to 3.7 $g/cm^3$, particularly preferably in a range from 3.5 to 3.6 $g/cm^3$ or in a range from 3.53 to 3.56 $g/cm^3$.

The following table 1 lists the components of six different AZS bricks. The brick identified with the letter E indicates an AZS brick according to the invention. The bricks identified with designators S1 to S5 are AZS bricks according to the prior art.

TABLE 1

|  | AZS bricks according to prior art | | | | | AZS brick according to invention |
|---|---|---|---|---|---|---|
| Components | S1 | S2 | S3 | S4 | S5 | E |
| Al₂O₃ | 51.0 | 48.6 | 53.45 | 45.55 | 68.0 | 64.20 |
| ZrO₂ | 32.7 | 36.5 | 36.5 | 41.0 | 17.0 | 16.83 |
| SiO₂ | 14.9 | 13.6 | 9.0 | 12.2 | 13.0 | 16.46 |
| Na₂O | 1.15 | 1.05 | 0.8 | 1.0 | 1.7 | 2.35 |
| Impurities | 0.25 | 0.25 | 0.25 | 0.25 | 0.3 | 0.16 |
| Vitreous phase | 20.0 | 17.5 | 13.0 | 16.5 | 21.0 | 24.8 |
| Bulk Density [g/cm³] | 3.72 | 3.85 | 3.93 | 4.0 | 3.65 | 3.55 |

All figures in percentage by mass unless otherwise indicated.

Bricks S1 to S5 and E were tested in respect of their tendency to exudate. For this purpose, the TC11 Exudation Test Guidelines (Technical Committee 11; TC 11) issued by the International Commission on Glass (ICG) were used. This test method for determining exudation is a generally recognised test method for determining exudation of fused cast AZS bricks.

The test method according to these TC 11 Exudation Test Guidelines is as follows:

Tested are samples of the following dimensions: cylinders with a diameter of 50 mm and a height of 100 mm. The samples are heated up to 1550° C. for several cycles (up to ten). The dwell time is 96 h for the first cycle and 2 h for all following cycles. After each cycle, the samples are cooled down to room temperature. Archimedes' principle is applied to determine volume increase due to exudation, i.e. volume of vitreous phase adherent on the surface of the specimen after the corresponding heating cycle.

In all, 10 heating-up cycles were performed to determine exudation. The loss of mass that the bricks according to table 1 underwent as a result of exudation is indicated in table 2, relative to the respective total mass of the bricks. Moreover, in table 2 is indicated the molar ratio between Al₂O₃ and Na₂O in the vitreous phase and in the bulk material, according to the bricks according to table 1.

TABLE 2

|  | AZS bricks according to prior art | | | | | AZS brick according to invention |
|---|---|---|---|---|---|---|
|  | S1 | S2 | S3 | S4 | S5 | E |
| Molar ratio Al₂O₃/Na₂O in vitreous phase | 2.95 | 2.77 | 2.17 | 2.7 | 1.65 | 1.37 |
| Molar ratio Al₂O₃/Na₂O in bulk material | 26.96 | 28.14 | 40.61 | 27.69 | 24.31 | 16.45 |
| Exudation [wt. %] | 5.88 | 4.95 | 3.17 | 3.96 | 9.61 | 0.43 |

The reduction in exudation in a fused cast AZS brick according to the invention compared with the exudation in a fused cast AZS brick according to the prior art is thus substantial.

Figure 2:
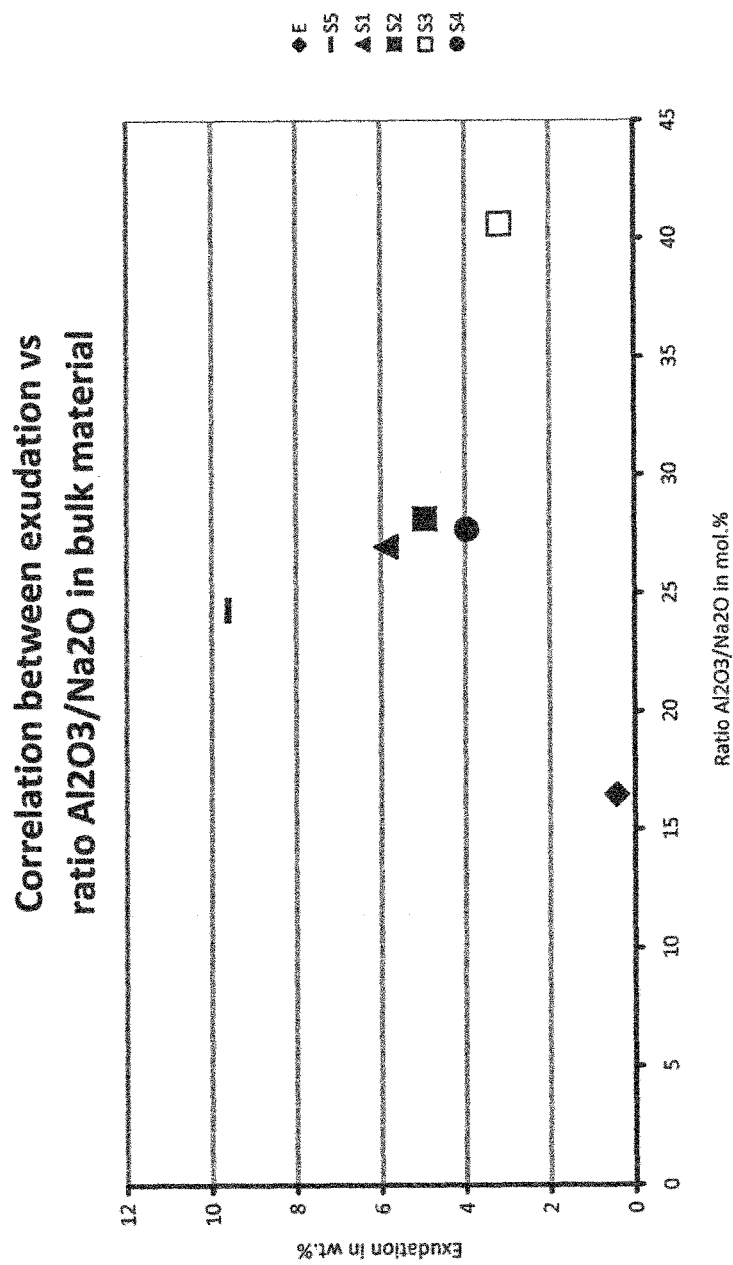
FIG. 2 describes the correlation between exudation vs. ratio $Al_2O_3/Na_2O$ in bulk material.

The correlation between the molar ratio between Al₂O₃ and Na₂O in the vitreous phase (FIG. 1) or in the bulk material (FIG. 2), respectively, on the one hand and the exudation on the other hand, according to table 2, is illustrated in FIGS. 1 and 2.

The fused cast refractory AZS brick according to the invention may be produced according to methods for producing fused cast AZS products known from the prior art. According to the known methods for producing fused cast AZS products, suitable raw materials are melted and the molten mass is cast into a mould. The molten mass cools down in the mould and upon solidifying forms the fused cast AZS brick. The raw materials may particularly be melted electrically, that is to say particularly with the aid of an electric arc.

The object of the invention is also a method as described previously for producing a material according to the invention and a material obtained according to said method.

Another object of the invention is the use of a material according to the invention in areas of apparatuses used in the melting of glass and/or for treating molten glass that do not come into contact with the molten glass.

Such apparatuses for melting glass or for treating molten glass may particularly be glass tanks, particularly melting tanks or gathering ends, for example container glass tanks or float glass tanks.

In particular, the materials according to the invention may be used in the superstructure or the crown of the apparatuses cited previously, that is to say in areas above the molten glass in the corresponding apparatuses.

All of the inventive features disclosed here may be implemented individually or may be used in any combination with each other.

The invention claimed is:

1. Fused cast refractory AZS material including aluminium oxide, zirconium dioxide and silicon dioxide as the main components, and having a vitreous phase fraction comprising Al₂O₃ and Na₂O, wherein the molar ratio between Al₂O₃ and Na₂O in the vitreous phase is in the range from 0.8 to 1.6, and wherein the mass fraction of the SiO₂ component in the material is in the range from 15.5 to 18% by mass and wherein the mass fraction of the Na₂O component in the material is in the range from 2.2 to 2.6% by mass, wherein the mass fraction of the Al₂O₃ component in the material is in the range of 60 to 70% by mass, and wherein the mass fraction of the ZrO₂ component in the material is in the range from 13.0 to 19.0% by mass.

2. The material according to claim 1 having a molar ratio between Al₂O₃ and Na₂O in the range from 14 to 21.3.

3. The material according to claim 1, having a vitreous phase fraction in the range from 20 to 30% by mass.

4. The material according to claim 1, having a mass fraction of components that are present in the material other than Al₂O₃, Na₂O, ZrO₂ and SiO₂ below 1.0% by mass.

5. A method comprising: using the material according to claim 1 in areas of apparatuses for melting glass or for treating molten glass that do not come into contact with the molten glass.

6. A fused cast refractory AZS material including aluminium oxide, zirconium dioxide and silicon dioxide as the main components, wherein the material has a vitreous phase, wherein within the vitreous phase there is a vitreous phase fraction, wherein the fraction comprises Al₂O₃ and Na₂O, wherein the molar ratio between Ai₂O₃ and Na₂O within the vitreous phase fraction is in the range from 0.8 to 1.6, and wherein the mass fraction of the SiO₂ component in the material is in the range from 15.9 to 18% by mass, the mass fraction of the Na₂O component in the material is in the range from 2.2 to 2.6% by mass, the mass fraction of the Al₂O₃ component in the material is in the range from 60 to 70% by mass, and the mass fraction of the ZrO₂ component is in the range from 13.0 to 19.0% by mass.

* * * * *